(12) United States Patent
Dubinsky

(10) Patent No.: US 6,343,630 B1
(45) Date of Patent: Feb. 5, 2002

(54) HIGH PRESSURE FILLING NOZZLE

(75) Inventor: Victor Dubinsky, Ontario (CA)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/463,330

(22) PCT Filed: May 21, 1999

(86) PCT No.: PCT/US99/11323

§ 371 Date: Apr. 12, 2000

§ 102(e) Date: Apr. 12, 2000

(87) PCT Pub. No.: WO99/61835

PCT Pub. Date: Dec. 2, 1999

(30) Foreign Application Priority Data

May 22, 1998 (CA) .............................................. 2238590

(51) Int. Cl.[7] ................................................. F16L 37/28
(52) U.S. Cl. ..................... 141/385; 285/322; 251/149.6; 137/614.05
(58) Field of Search ................................ 141/346, 349, 141/350, 383–386; 285/314–316, 322, 900; 251/149.6; 137/614.05

(56) References Cited

U.S. PATENT DOCUMENTS

| 5,080,132 A | * | 1/1992 | Manz et al. ........... 137/614.04 |
| 5,575,510 A | | 11/1996 | Weh et al. |
| 5,740,835 A | * | 4/1998 | Murphy ................. 137/614.05 |
| 5,788,289 A | * | 8/1998 | Cronley ...................... 285/102 |

FOREIGN PATENT DOCUMENTS

| EP | 0-039977 | 11/1981 |
| FR | 2-063957 | 7/1971 |
| GB | 1-118721 | 7/1968 |

* cited by examiner

Primary Examiner—David J. Walczak
Assistant Examiner—Perez deVore
(74) Attorney, Agent, or Firm—Dinsmore & Shohl LLP (57) ABSTRACT

A fluid nozzle (1) for dispensing high pressure fluids includes an outer sleeve, a nozzle inlet (3) for receiving a high pressure fluid and a nozzle outlet (4) for discharging the high pressure fluid, an inner pipe in fluid communication with the nozzle inlet and the nozzle outlet, a valve biased to close the fluid flow passage through the inner pipe, a piston (6), and a plurality of radially movable connecting jaws (5) positioned about the periphery of the outlet (4). The connecting jaws (5) have first ends engaging the piston (6) and second ends for engaging an inlet of a fluid receptacle (2). In the connected position, the pressure exerted by the fluid causes the connecting jaws (5), the piston (6), and the inner pipe to move axially relative to the outer sleeve and in turn causes the valve to open, permitting passage of the high pressure fluid through the nozzle.

9 Claims, 9 Drawing Sheets

HIGH PRESSURE FILLING NOZZLE

BACKGROUND OF THE INVENTION

Field of the Invention

This invention relates to a high pressure filling nozzle. In particular, the invention relates to a nozzle which provides a sealed connection to an inlet of a receptacle for filling the receptacle.

SUMMARY OF THE INVENTION

It is an object of the invention to provide a nozzle which can quickly, easily, and safely create a sealed connection to an inlet of a receptacle for filling the receptacle with the high pressure fluid.

BRIEF DESCRIPTION OF THE DRAWINGS

In order that the invention may be more clearly understood, the preferred embodiment thereof will now be described in detail by way of example, with reference to the accompanying drawings, in which.

DESCRIPTION OF THE PREFERRED EMBODIMENT

According to the present invention, there is provided a fluid nozzle for dispensing high pressure fluids comprising an outer sleeve, a nozzle inlet for receiving a high pressure fluid and a nozzle outlet for discharging the high pressure fluid, an inner pipe in fluid communication with the nozzle inlet and the nozzle outlet, a valve biased to close the fluid flow passage through the inner pipe, a piston, and a plurality of radially movable connecting jaws positioned about the periphery of the outlet. The connecting jaws have first ends engaging the piston and second ends for engaging an inlet of a fluid receptacle. In the connected position, the pressure exerted by the fluid causes the connecting jaws, the piston, and the inner pipe to move axially relative to the outer sleeve and in turn causes the valve to open, permitting passage of the high pressure fluid through the nozzle.

In accordance with another feature of the invention, the valve of is arranged in an inlet cavity.

In accordance with another aspect of the invention, the connecting jaws extend in an axial direction beyond the nozzle outlet and are radially movable inwardly to securely attach and seal the nozzle outlet with a receptacle inlet. Further, a control ring is arranged adjacent the connecting jaws and is axially movable relative thereto. The axial movement of the control ring allows radial movement of the connecting jaws.

In accordance with another aspect of the invention, the piston is arranged in a piston cavity. This cavity is capable of being in fluid communication with the inlet cavity. Further, the valve is biased to close the fluid flow passage through the inner pipe by the pressure of a high pressure fluid in the inlet cavity. The area of the piston cavity on which the high pressure fluid acts is larger than the area on which high pressure fluid acts to bias the valve closed.

Further features of the invention are found in providing a nozzle housing having a bore therein, a pin connected to the outer sleeve and received in the bore, and a channel in the pin which is in fluid communication with the piston cavity. The housing is axially movable with respect to the outer sleeve in order to position the pin channel in fluid communication with the inlet cavity.

Figure 1:
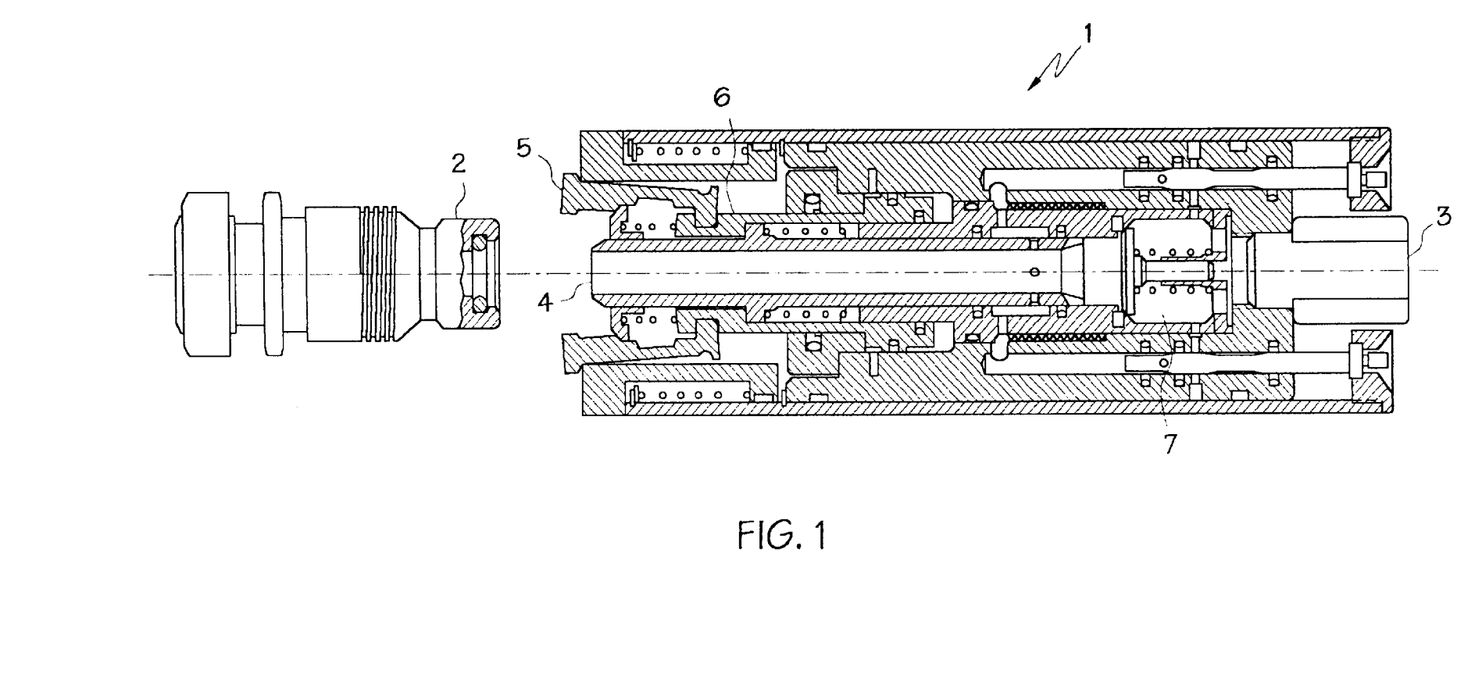
FIG. 1 is a cross-sectional view of a preferred embodiment of the invention in a disengaged position.

Referring now to the drawings in detail, wherein like numerals indicate the same elements throughout the views, FIG. 1 shows a filling nozzle 1 in the disconnected position, and a corresponding receptacle inlet 2 sealably connected to any suitable receptacle (not shown), such as, for example, a fuel tank of a gaseous fuel vehicle. The filling nozzle is connected to a supply of high pressure fluid (not shown). The nozzle has a nozzle inlet 3 for the high pressure fluid and an outlet 4, which seals against the inlet 2 of the receptacle to fill the receptacle. A plurality of connecting jaws 5 are connected to a piston 6. The jaws are positioned around the periphery of the outlet 4 and are radially movable. High pressure fluid occupies the inlet cavity 7.

Figure 2:
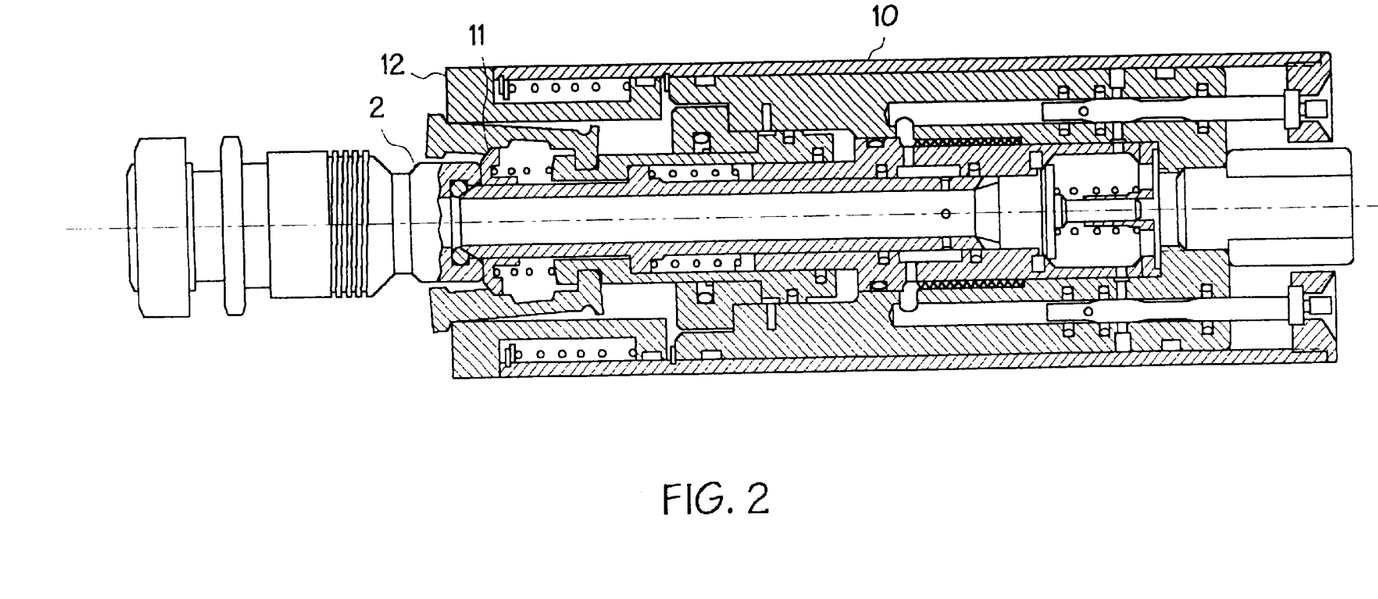
FIG. 2 is a cross-sectional view of the preferred embodiment in a partially engaged position.

As shown in FIG. 2, the filling nozzle is connected to the receptacle inlet 2 by pressing the receptacle inlet against the control ring 11 and sliding a retaining ring 12 projecting axially from the outlet end of the outer sleeve 10 toward the receptacle.

Figure 3:
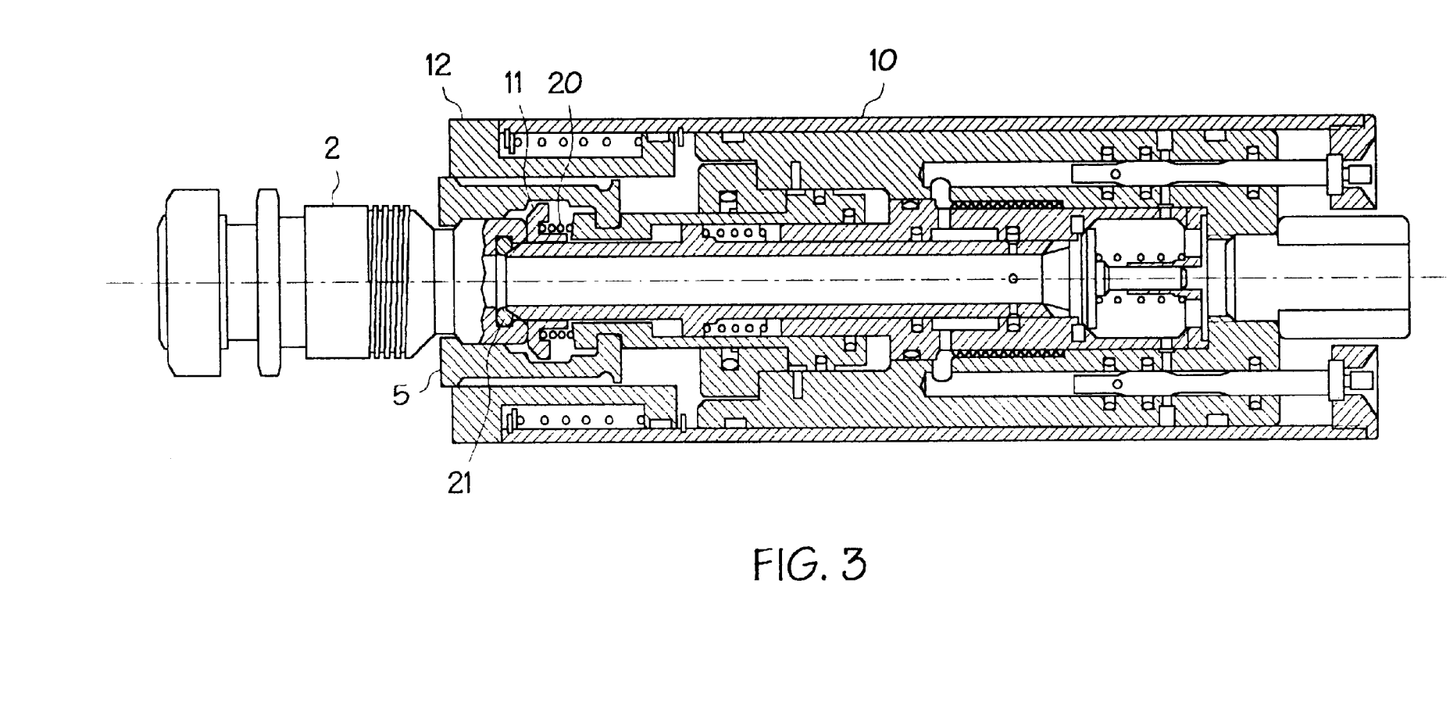
FIG. 3 is a cross-sectional view of the preferred embodiment connected to a receptacle.

As shown in FIG. 3, the receptacle inlet 2 pushes against the control ring 11, compressing the control ring against the control spring 20. The movement of the outer sleeve toward the receptacle causes the retaining ring 12 to push the jaws 5 radially inward to securely attach and seal the nozzle to the receptacle inlet. A seal 21 provides a gas-tight connection between the nozzle outlet 4 and receptacle inlet.

Figure 4:
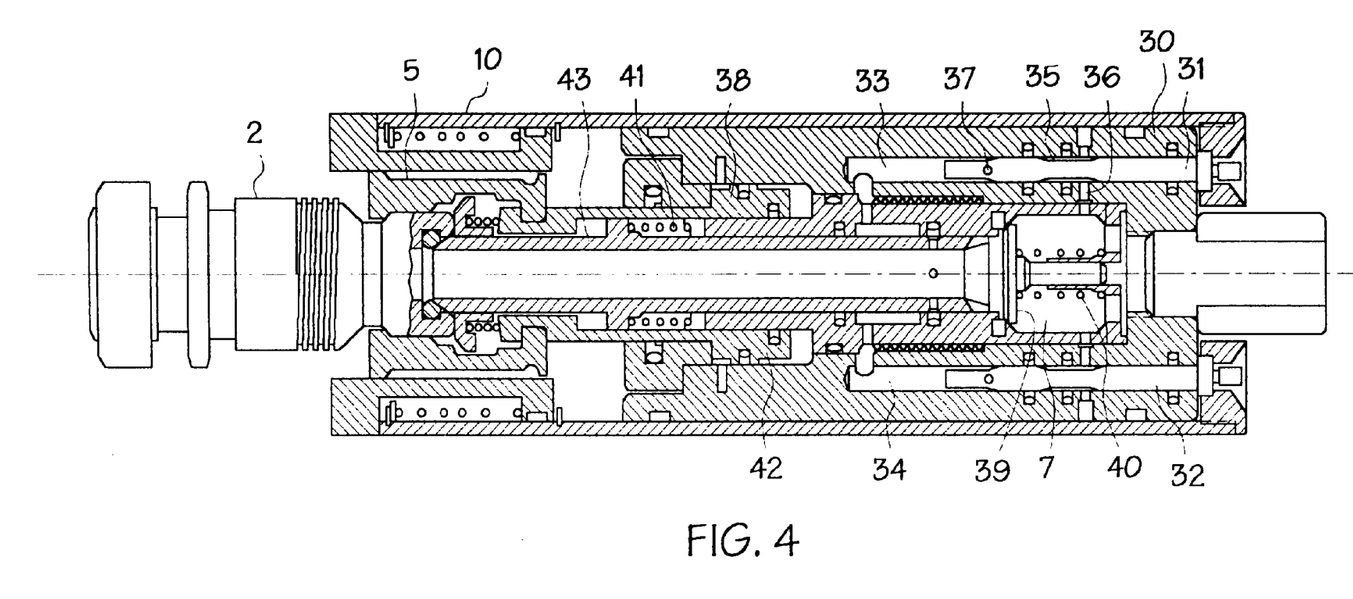
FIG. 4 is a cross-sectional view of the preferred embodiment connected to a receptacle.

FIG. 4 shows the outer sleeve 10 abutting the nozzle housing 30. The sleeve is prevented from moving any relative to the housing. A first pin 31 and second pin 32 project axially from the end of the outer sleeve. The first and second pins are received in a corresponding first bore 33 and second bore 34, respectively. A first groove 35 is defined in the first pin 3 1. In the connected position shown in FIG. 4, the first groove is in fluid communication with a radial channel 36 which in turn is in fluid communication with the inlet cavity 7. The first groove 35 permits the high pressure fluid to communicate with a first drilling 37 (only the entry point is shown). The drilling is in fluid communication with a piston cavity 38. Accordingly, the high pressure fluid travels through the first drilling 37 to occupy the piston cavity 38.

Figure 5:
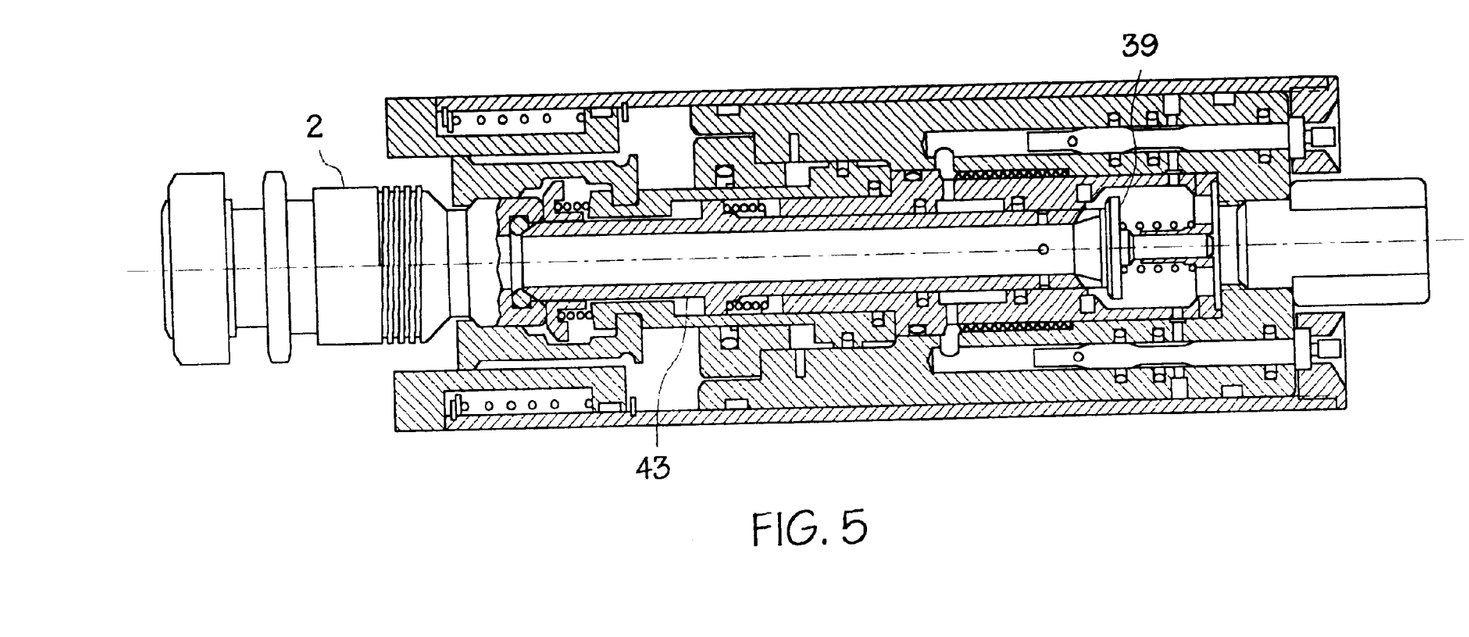
FIG. 5 is a cross-sectional view of the preferred embodiment connected to a receptacle in a valve open position.

The area of the piston cavity 38 on which the high pressure acts is larger than the combined forces of the high pressure acting on the valve 39, the valve spring 40, and the piston spring 41. Accordingly, the force generated by the high pressure fluid in the piston cavity moves the piston 42, jaws 5, and main pipe 43 to the right toward the nozzle inlet 3 relative to the remainder of the nozzle. This in turn causes the valve 39 to open and the high pressure fluid to travel through the main pipe 43 to the receptacle inlet 2, as shown in FIG. 5.

Figure 6:
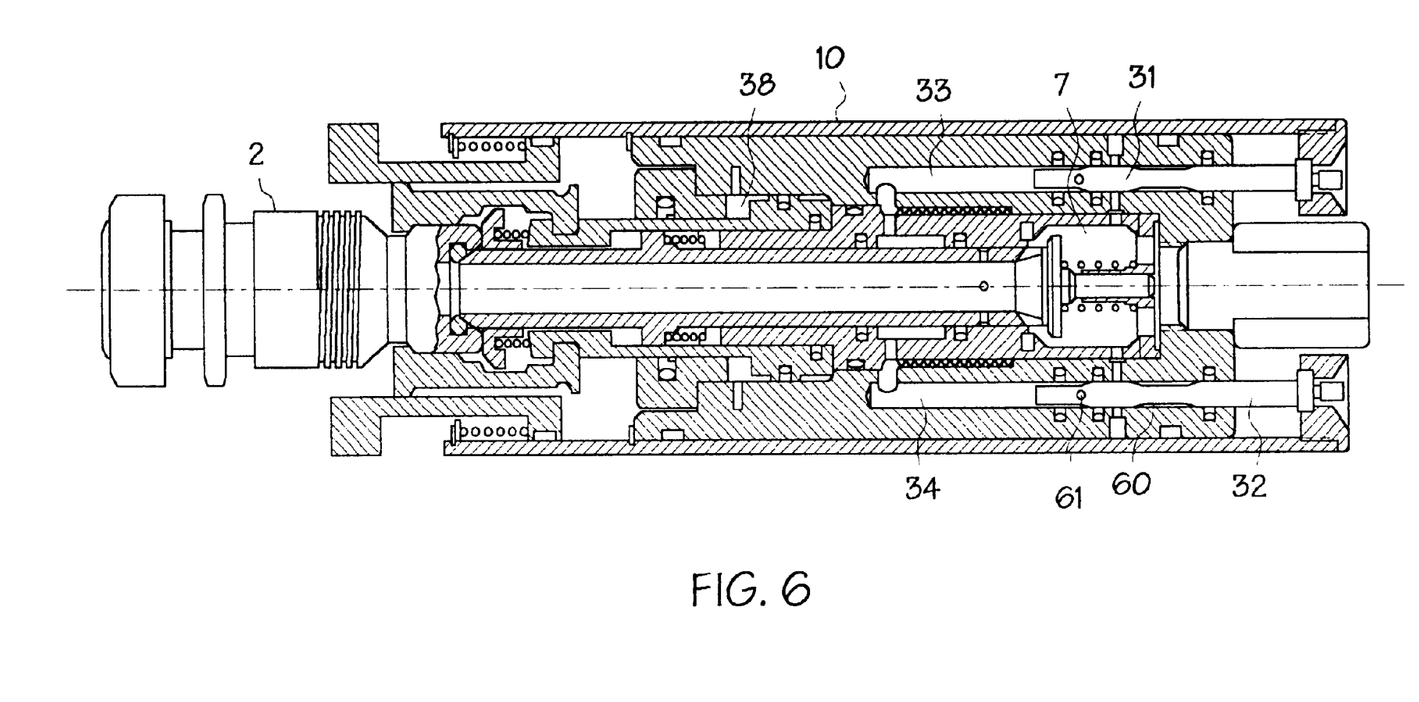
FIG. 6 is a cross-sectional view of the preferred embodiment connected to a receptacle commencing disengagement.
Figure 9:
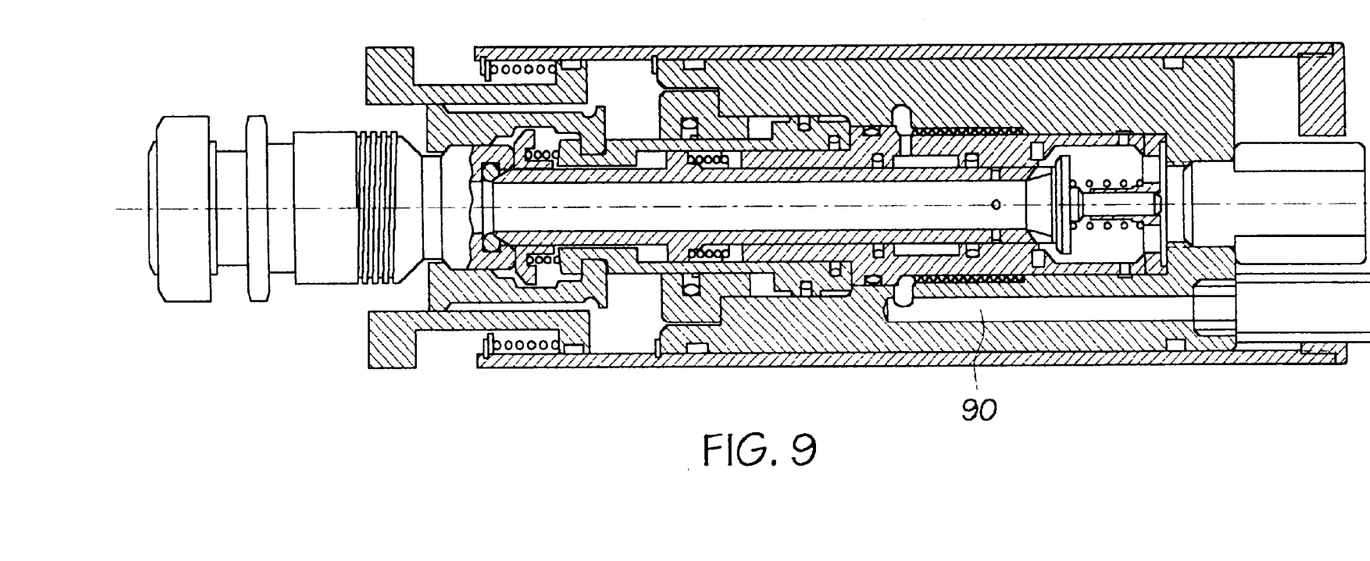
FIG. 9 is a cross-sectional view of the preferred embodiment perpendicular to the cross-sectional views of FIGS. 1–8.

After the filling of the receptacle is complete, the nozzle can be disengaged by sliding the sleeve 10 away from the receptacle inlet 2, as shown in FIG. 6. The equilization of the pressure between the inlet cavity 7 and the piston cavity 38 permits easy disengagement of the nozzle. The sliding of the sleeve acts to withdraw the first pin 31 and second pin 32 from the first bore 33 and second bore 34, respectively. A second groove 60 defined in second pin 32. The second groove is brought into fluid communication with a second drilling 61 (only exit point shown) in fluid communication with the piston cavity 38. The high pressure fluid from piston cavity 38 vents through the second drilling 61 and second groove 60 out to atmosphere through a vent channel 90 (shown in FIG. 9). The high pressure fluid in the inlet cavity 7 causes the valve 39 to close by reversing the movement of the parts described in FIG. 5.

Figure 7:
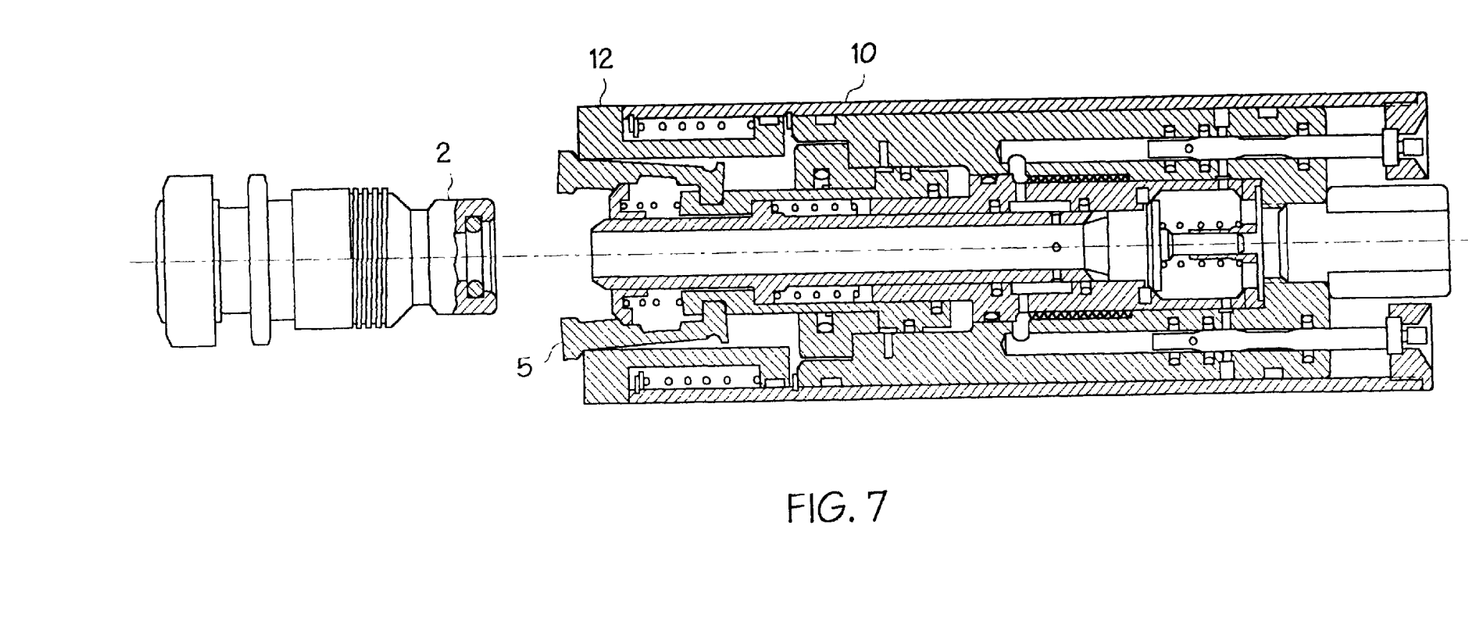
FIG. 7 is a cross-sectional view of the preferred embodiment in a disengaged position.

FIG. 7 (identical to FIG. 1) shows the nozzle disengaged from the receptacle inlet 2. The sliding of the sleeve 10 away from the receptacle causes the retaining ring 12 to release to release the jaws 5. The nozzle can be then be withdrawn from the receptacle inlet.

Figure 8:
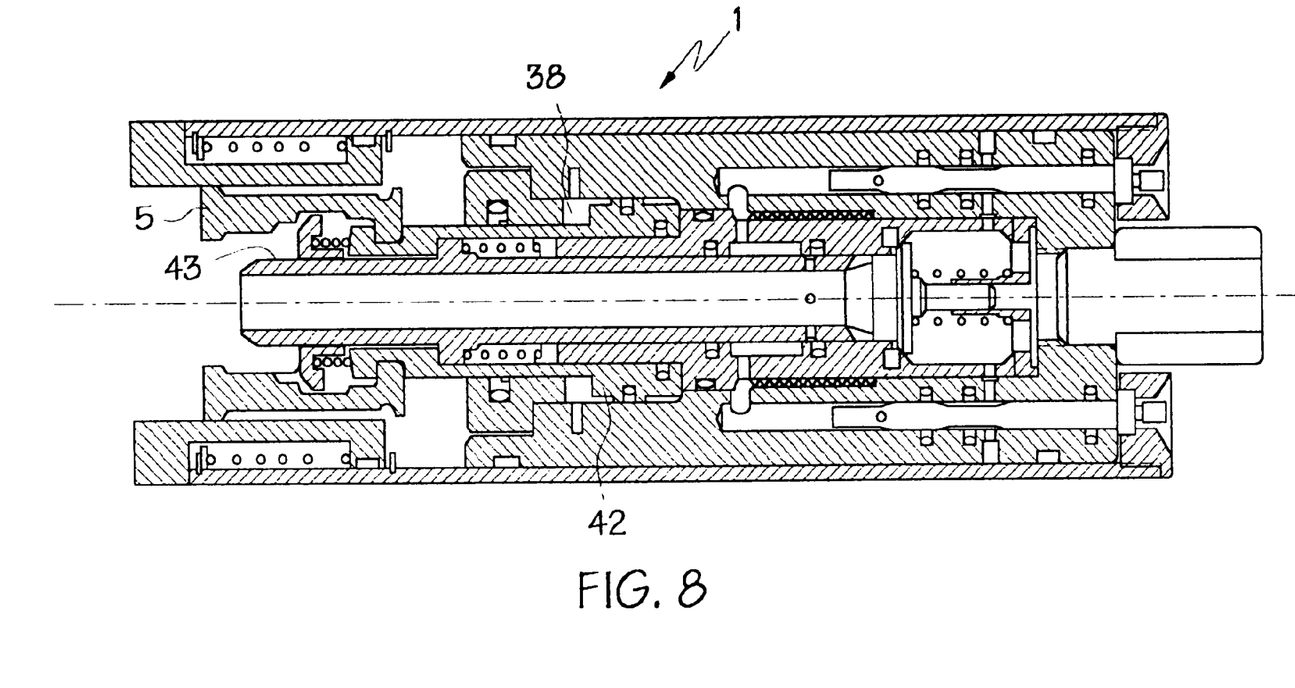
FIG. 8 is a cross-sectional view of the preferred embodiment in the engaged position without a receptacle.

FIG. 8 shows a safety feature of the nozzle I in the event that a user attempts to dispense the high pressure fluid without coupling the nozzle to the receptacle inlet 2. In this position, the high pressure fluid fills the piston cavity 38, as described above. Although the piston 42 and the jaws 5 move relative to the rest of the nozzle, as described above, the main pipe 43 does not move because the jaws are not secured to the receptacle inlet 2. Accordingly, the valve cannot be open to permit flow of the high pressure fluid through the nozzle.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed is:

1. A fluid dispensing nozzle, comprising:
   an outer sleeve, a nozzle inlet for receiving a high pressure fluid and a nozzle outlet for discharging the high pressure fluid;
   an inner pipe in fluid communication with the nozzle inlet and the nozzle outlet;
   a valve biased to close the fluid flow passage through the inner pipe;
   a piston;
   a plurality of radially movable connecting jaws positioned about the periphery of the outlet, the connecting jaws having first ends engaging the piston and second ends for engaging an inlet of a receptacle in which fluid is to be dispensed; and
   at least one control ring arranged adjacent the connecting jaws and axially moveable relative thereto,
   wherein the connecting jaws, the piston and the inner pipe are axially movable relative to the outer sleeve, and wherein the piston can be actuated to open the valve and permit passage of high pressure fluid through the nozzle.

2. The fluid dispensing nozzle according to claim 1, wherein the valve is arranged in an inlet cavity.

3. The fluid dispensing nozzle according to claim 1, wherein the connecting jaws extend axially beyond the nozzle outlet and are radially movable inwardly to securely attach and seal the nozzle outlet with a receptacle inlet.

4. The fluid dispensing nozzle according to claim 1, wherein the piston is arranged in a piston cavity, the piston cavity is capable of being in fluid communication with the inlet cavity.

5. The fluid dispensing nozzle according to claim 4, wherein the valve is biased to close the fluid flow passage through the inner pipe by the pressure of a high pressure fluid in the inlet cavity, and further wherein when the piston cavity is in fluid communication with the inlet cavity, the area of the piston cavity on which high pressure fluid acts is larger than the area on which high pressure fluid acts to bias the valve closed.

6. The fluid dispensing nozzle of claim 1, wherein the axial movement of the control ring is adapted to allow radial movement of the connecting jaws.

7. A fluid dispensing nozzle, comprising:
   an outer sleeve, a nozzle inlet for receiving a high pressure fluid and a nozzle outlet for discharging the high pressure fluid;
   an inner pipe in fluid communication with the nozzle inlet and the nozzle outlet;
   a valve biased to close the fluid flow passage through the inner pipe;
   a piston;
   a plurality of radially movable connecting jaws positioned about the periphery of the outlet, the connecting jaws having first ends engaging the piston and second ends for engaging an inlet of a receptacle in which fluid is to be dispensed, the connecting jaws extending axially beyond the nozzle outlet and being radially movable inwardly to securely attach and seal the nozzle outlet with a receptacle inlet; and
   at least one control ring arranged adjacent to the connecting jaws and axially movable relative thereto, the axial movement of the control ring adapted to allow radial movement of the connecting jaws,
   wherein the connecting jaws, the piston and the inner pipe are axially movable relative to the outer sleeve, and wherein the piston can be actuated to open the valve and permit passage of high pressure fluid through the nozzle.

8. A fluid dispensing nozzle, comprising:
   an outer sleeve, a nozzle inlet for receiving a high pressure fluid and a nozzle outlet for discharging the high pressure fluid;
   an inner pipe in fluid communication with the nozzle inlet and the nozzle outlet;
   a valve biased to close the fluid flow passage through the inner pipe;

a piston;

a plurality of radially movable connecting jaws positioned about the periphery of the outlet, the connecting jaws having first ends engaging the piston and second ends for engaging an inlet of a receptacle in which fluid is to be dispensed; and a nozzle housing having at least one bore therein, at least one pin connected to the outer sleeve and received in the bore, and at least one channel in the pin which is in fluid communication with a piston cavity, wherein the connecting jaws, the piston and the inner pipe are axially movable relative to the outer sleeve, and wherein the piston can be actuated to open the valve and permit passage of high pressure fluid through the nozzle.

9. The fluid dispensing nozzle according to claim 8, wherein the housing is axially movable with respect to the outer sleeve to position the pin channel in fluid communication with the inlet cavity.

* * * * *